(12) United States Patent
Bolte et al.

(10) Patent No.: US 8,748,511 B2
(45) Date of Patent: Jun. 10, 2014

(54) CURABLE COMPOSITION

(75) Inventors: Andreas Bolte, Solingen (DE); Helene Boudet, Duesseldorf (DE); Bernhard Schoettmer, Monheim (DE); Nick Spielkamp, Essen (DE)

(73) Assignee: Henkel AG & Co., KGaA, Duesseldorf (DE)

( * ) Notice: Subject to any disclaimer, the term of this patent is extended or adjusted under 35 U.S.C. 154(b) by 0 days.

(21) Appl. No.: 13/267,295

(22) Filed: Oct. 6, 2011

(65) Prior Publication Data

US 2012/0123016 A1     May 17, 2012

Related U.S. Application Data

(63) Continuation of application No. PCT/EP2010/053878, filed on Mar. 25, 2010.

(30) Foreign Application Priority Data

Apr. 6, 2009   (DE) .......................... 10 2009 002 230

(51) Int. Cl.
  *C08K 7/22*   (2006.01)
  *C08G 18/42*  (2006.01)

(52) U.S. Cl.
  USPC ............ 523/205; 523/206; 523/223; 524/539

(58) Field of Classification Search
  USPC .......................... 523/205, 206, 223; 524/539
  See application file for complete search history.

(56) References Cited

U.S. PATENT DOCUMENTS

| | | | |
|---|---|---|---|
| 4,323,488 A | 4/1982 | Takago et al. | |
| 2003/0171479 A1* | 9/2003 | Lennon | 524/501 |
| 2004/0236009 A1 | 11/2004 | Mafoti et al. | |
| 2006/0173121 A1* | 8/2006 | Tamai | 524/502 |
| 2010/0036049 A1* | 2/2010 | Matsushita et al. | 524/588 |

FOREIGN PATENT DOCUMENTS

| | | |
|---|---|---|
| DE | 31 00 746 | 7/1982 |
| DE | 195 02 128 | 8/1996 |
| EP | 0 520 426 | 12/1992 |
| WO | 2007/091961 | 8/2007 |

OTHER PUBLICATIONS

International Search Report issued in connection with International Application No. PCT/EP2010/053878 mailed on May 25, 2010.

* cited by examiner

*Primary Examiner* — Kriellion Sanders
(74) *Attorney, Agent, or Firm* — James E. Piotrowski

(57) ABSTRACT

Curable compositions comprising a) an alkoxysilane and/or acyloxysilane terminated polymer having at least one end group of the general formula (I) -$A_n$-R—SiXYZ (I) and b) hollow microspheres made of a copolymer obtained by the polymerization of methacrylonitrile and at least one monomer M2 selected from the group consisting of acrylic acid, methacrylic acid, acrylic acid alkyl esters and methacrylic acid alkyl esters, wherein the copolymer comprises at maximum 5 wt. % units that are due to the installation of additional monomers and is free of units containing chlorine, to a method for the production thereof and to the use thereof as silane cross-linking adhesive, sealing or coating substances.

18 Claims, No Drawings

CURABLE COMPOSITION

The invention relates to curable compositions based on alkoxysilane- and/or acyloxysilane-terminated polymers and specific fillers, their manufacture and use.

Polymer systems that possess reactive silyl groups are known. These silane crosslinking polymers generally possess an organic backbone that carries e.g. alkoxy or acyloxy silane groups on the ends. In the presence of moisture from the air, such polymers, which possess silyl groups with hydrolysable substituents, are capable of condensing together even at room temperature. Depending on the content of silyl groups with hydrolysable substituents and on the structure of these silyl groups, there are formed mainly long-chain polymers (thermoplastics), relatively loosely crosslinked, three-dimensional networks (elastomers) or highly crosslinked systems (thermosets).

The use of these polymer systems as components of binding agents in curable compositions is known, in particular in silane crosslinking adhesives, sealants or coatings. These curable compositions generally comprise at least one filler in addition to the binding agent. Filler is added on the one hand for reasons of cost, on the other hand both the properties of the curable composition as well as of the resulting cured product can be influenced in this way.

A large number of suitable fillers have already been described. Typical fillers are for example chalk, lime powder, silica, clay and other ground minerals, but also organic fillers, such as for example carbon black, graphite or wood fibers.

For manufacturing curable compositions of particularly low density, the use of inorganic or organic hollow microspheres has been suggested on various occasions. Hollow microspheres are understood to mean geometric entities that can be designated as a balloon or ball, and which have a shell of inorganic or organic material, wherein this shell completely surrounds a cavity. The cavity is generally filled with a gas or a liquid. The geometric entities are essentially spherical in shape, but can also deviate from the shape of an ideal sphere and for example have an egg shape or exhibit small bulges. The diameter of the individual spheres is maximum 1 mm, preferably maximum 500 µm.

Inorganic hollow microspheres, for example glass hollow microspheres, are relatively brittle, such that the danger exists that they can already be destroyed as they are blended into the curable composition, thereby negating the desired effect. Moreover, the stability of the cured product is reduced.

US 2004/0236009 A1 discloses curable compositions that comprise a curable material and a material that reduces the density, wherein the latter should not essentially influence adhesive and sealing properties of the curable composition. Silane-modified polymers are cited as the curable material. For the material that reduces the density, it typically concerns hollow microspheres. For example, hollow microspheres are cited that are available under the trade name Expancel®. More precise information on which of the many commercial products under this trade name were meant, is lacking. Even in the examples, Expancel® in general is mentioned.

Curable compositions that comprise a crosslinking silane-modified oxyalkylene polymer and hollow microspheres that are based on vinylidene chloride polymer or copolymer are known from EP 0 520 426 B1. Corresponding hollow microspheres are marketed for example under the trade name Expancel®. It was remarked that the use of these hollow microspheres leads to improved properties of the cured product in comparison with the use of other hollow microspheres. Thus, comparatively low moduli can be achieved without impairing the extensibility. However, for many applications it is desirable to still further improve the mechanical properties of the products manufactured from curable compositions, particularly from sealants and adhesives.

Accordingly, the object of the present invention was to provide curable compositions of low density which can be processed to form products with improved mechanical properties. In particular, the cured products should be characterized by low moduli and simultaneous high extensibility.

It has now been surprisingly found that the object can be achieved by the use of hollow microspheres of specific methacrylonitrile-(meth)acrylate copolymers.

The subject matter of the present invention is therefore curable compositions, comprising
a) an alkoxysilane and/or acyloxysilane-terminated polymer containing at least one end group of the general Formula (I)

$$-A_n-R-SiXYZ \qquad (I),$$

in which
  A stands for a divalent binding group,
  R stands for a divalent $C_1$-$C_{12}$ hydrocarbon group that optionally contains a heteroatom,
  X, Y, Z each independently of one another stand for a $C_1$-$B_8$ alkyl, $C_1$-$C_8$ alkoxy or $C_1$-$C_8$ acyloxy group, wherein at least one of the groups X, Y, Z is a $C_1$-$C_8$ alkoxy or $C_1$-$C_8$ acyloxy group, and
  n stands for 0 or 1, and
b) hollow microspheres, made of a copolymer that is obtainable by polymerizing methacrylonitrile and at least one monomer M2, selected from acrylic acid, methacrylic acid, acrylic acid alkyl esters and methacrylic acid alkyl esters, wherein the copolymer comprises maximum 5 wt. % of units incorporated from additional monomers, and is free of chlorine-containing units.

The curable compositions according to the invention are characterized in particular in that they can be processed to form products with a low modulus and a simultaneous high extensibility. It is of further advantage that no polymers based on vinylidene chloride must be added. The use of chlorine-containing polymers is questionable from ecological reasons. Thus, it is known that compounds that are detrimental to the environment and to health can result when polymers of this type are decomposed or burnt. This problem can be avoided by the inventive use of hollow microspheres based on chlorine-free polymers.

The inventive curable compositions preferably are silane-crosslinking adhesives, sealants or coatings that comprise as the binding agent one or more organic polymers that carry a silyl group on at least one chain end, wherein the silyl groups themselves comprise at least one, preferably two or three, alkoxy group(s) or acyloxy group(s). These polymeric compounds are called alkoxysilane- and/or acyloxysilane-terminated polymers. In the presence of moisture from the air or by contacting them with water, polymers, which possess silyl groups with these types of hydrolysable substituents, are capable, by cleavage of the hydrolysable groups, of condensing together even at room temperature. Depending on the content of silyl groups with hydrolysable substituents and on the composition of these silyl groups, there are formed mainly long-chain polymers (thermoplastics), relatively loosely crosslinked, three-dimensional networks (elastomers) or highly crosslinked systems (thermosets). The inventive curable compositions therefore comprise as the binding agent essentially organic polymers or organosilicon polymers, consisting of an organic backbone with carbon atoms in the main chain. The advantage of the inventive development, in particular the use of alkoxysilane- and/or acyloxysilane-terminated polymers as the binding agent, as opposed to inorganic binding agents, is especially the good adhesion to/on the most varied substrates, as well as the high elasticity of the backbone structure.

The alkoxysilane- and/or acyloxysilane-terminated polymer comprised in the inventive curable compositions exhibits at least one end group of the general Formula I

$$-A_n-R-SiXYZ \qquad (I).$$

In Formula (I), A stands for a divalent linking group. Here, a divalent chemical group is understood to mean that the polymer backbone of the alkoxysilane- and/or acyloxysilane-terminated polymer is linked to the R group of the end group. The divalent linking group A can for example be formed when the alkoxysilane- and/or acyloxysilane-terminated polymer is produced, e.g. as a urethane group by the reaction of a hydroxyl group-functionalized polyether with an isocyanato-functional alkoxysilane. In this regard, the divalent linking group can be both distinguishable as well as non-distinguishable from the resulting structural features in the basic polymer backbone. A non-distinguishable structural feature occurs for example when it is identical with the points of attachment of the repeat units of the polymer backbone. In this case, n would correspond to the value 0. When the linking group A is distinguishable from the linking groups in the polymer backbone, then n corresponds to the value 1.

In the context of the above definition, isocyanato-functional alkoxysilanes are understood to mean short-chain, monomeric compounds containing a terminal silyl group, and which comprise an isocyanate function (-NCO) on at least one additional chain end. Alkoxysilane-terminated prepolymers or polymers can be obtained by treating polymers that comprise groups, e.g. hydroxyl or amino groups, that are reactive towards isocyanate-functions, with isocyanato-functional alkoxysilanes.

Preferably, A stands for an amide, carbamate, urea, imino, carboxylate, carbamoyl, amidino, carbonate, sulfonate or sulfinate group or an oxygen or nitrogen atom.

A plurality of methods are described in the prior art for linking a reactive silyl group with a polymer backbone. The polymerization of unsaturated monomers with those that e.g. exhibit alkoxysilyl groups may be mentioned. A suitable monomer of the latter type would be vinyl trimethoxysilane for example. Another method is the grafting of unsaturated monomers such as e.g. vinyl trimethoxysilane onto thermoplastics, for example onto polyethylene. Hydrosilation, the noble metal catalyzed addition of silanes or H-silanes such as for example methyl dimethoxysilane onto carbon-carbon double bonds, is frequently used. In this process the group that comprises the terminal silyl group bonds directly, i.e. without an additional linking group, to the polymer backbone (n=0 in Formula (I)).

Urethane and urea groups are particularly preferred linking groups; they can be obtained by treating certain functional groups of a prepolymer with an organosilane that carries another functional group. Urethane groups can result for example when either the polymer backbone comprises terminal hydroxyl groups and isocyanato-functional alkoxysilanes, also occasionally referred to as isocyanato silanes, are added as the additional component, or conversely when a polymer that has terminal isocyanate groups is treated with an alkoxysilane that comprises terminal hydroxyl groups (hydroxyl-functional alkoxysilane). In the same way, urea groups can be obtained when a terminal primary or secondary amino group—either on the silane or on the polymer is added and which reacts with a terminal isocyanate group that is present in the respective reaction partner. This means that either an amino functional alkoxysilane (amino silane) is made to react with a polymer having a terminal isocyanate group, or a polymer that is terminally substituted with an amino group is made to react with an isocyanato functional alkoxysilane.

Urethane and urea groups advantageously increase the tensile strength of the polymer chains and of the crosslinked polymer as a whole, because they can form hydrogen bonds.

Hydroxy or amino functional alkoxysilanes are understood to mean short chain, monomeric compounds that contain a terminal silyl group and which have a hydroxy or a primary or secondary amino group on at least one additional end. Both the hydroxyl as well as the amino groups therefore possess at least one labile hydrogen atom and are reactive towards polymers that contain terminal isocyanate groups.

The following can be employed for example as the isocyanato functional alkoxysilanes or isocyanato silanes: trimethoxysilylmethyl isocyanate, triethoxysilylmethyl isocyanate, trimethoxysilylethyl isocyanate, triethoxysilylethyl isocyanate, trimethoxysilylpropyl isocyanate, triethoxysilylpropyl isocyanate, trimethoxysilylbutyl isocyanate, triethoxysilylbutyl isocyanate, trimethoxysilylpentyl isocyanate, triethoxysilylpentyl isocyanate, trimethoxysilylhexyl isocyanate, triethoxysilylhexyl isocyanate, methyldimethoxysilylmethyl isocyanate, ethyldimethoxysilylmethyl isocyanate, methyldiethoxysilylmethyl isocyanate, ethyldiethoxysilylmethyl isocyanate, methyldimethoxysilylethyl isocyanate, ethyldimethoxysilylethyl isocyanate, methyldiethoxysilylethyl isocyanate, ethyldiethoxysilylethyl isocyanate, methyldimethoxysilylpropyl isocyanate, ethyldimethoxysilylpropyl isocyanate, methyldiethoxysilylpropyl isocyanate, ethyldiethoxysilylpropyl isocyanate, methyldimethoxysilylbutyl isocyanate, ethyldimethoxysilylbutyl isocyanate, methyldiethoxysilylbutyl isocyanate, diethylethoxysilylbutyl isocyanate, ethyldiethoxysilylbutyl isocyanate, methyldimethoxysilylpentyl isocyanate, ethyldimethoxysilylpentyl isocyanate, methyldiethoxysilylpentyl isocyanate, ethyldiethoxysilylpentyl isocyanate, methyldimethoxysilylhexyl isocyanate, ethyldimethoxysilylhexyl isocyanate, methyldiethoxysilylhexyl isocyanate, ethyldiethoxysilylhexyl isocyanate.

Trimethoxysilylmethyl isocyanate, triethoxysilylmethyl isocyanate, trimethoxysilylpropyl isocyanate and triethoxysilylpropyl isocyanate, methyldimethoxysilylmethyl isocyanate, methyldiethoxysilylmethyl isocyanate, methyldimethoxysilylpropyl isocyanate and ethyldimethoxysilylpropyl isocyanate are particularly preferably used.

For the reaction with a polymer that has a terminal hydroxyl group, the isocyanato silane(s) are employed in an at least stoichiometric quantity to the hydroxyl groups of the polymer; preferably however, a slight stoichiometric excess of the isocyanato silanes to the hydroxyl groups is used.

In Formula (I) n stands for 0 or 1, i.e. the divalent linking group A links the polymer backbone to the group R (n=1) or the polymer backbone is bonded or linked directly to the group R (n=0).

The R group is a divalent $C_1$-$C_{12}$ hydrocarbon group that optionally comprises a heteroatom. Oxygen (O) or nitrogen (N) can be comprised for example as the heteroatom. The hydrocarbon group can be a straight chain or branched or cyclic, substituted or un-substituted alkenyl group, for example. The hydrocarbon group can be saturated or unsaturated.

X, Y and Z are independently of one another $C_1$-$C_8$ alkyl groups, $C_1$-$C_8$ alkoxy groups or $C_1$-$C_8$ acyloxy groups. In this regard, at least one of the groups X, Y, Z must be a hydrolysable group, i.e. a $C_1$-$C_8$ alkoxy group or a $C_1$-$C_8$ acyloxy group. Alkoxy groups, especially methoxy, ethoxy, propoxy and butyoxy groups, are preferably selected as the hydrolysable groups. This is advantageous, as no substances that irritate the mucous membranes are released as the alkoxy group-containing compositions are cured. In the released amounts, the alcohols that are formed are harmless and evaporate. Consequently, compositions of this type are particularly suitable for the do-it-yourself sector. However, acyloxy groups, such as an acetoxy group —O—CO—CH$_3$, can also be used as the hydrolysable groups.

According to a preferred embodiment of the inventive curable composition, the alkoxysilane- and/or acyloxysilane-terminated polymer possesses at least two end groups of the general Formula (I). Each polymer chain thus comprises at least two linking sites, at which the polymers can undergo condensation through cleavage of the hydrolysable groups in the presence of atmospheric humidity. In this manner a regular and rapid crosslinkability is achieved, such that for example adhesive bondings can be obtained with a good strength. Moreover, the amount and the structure of the hydrolysable groups—e.g. the use of dialkoxy- or trialkoxysilyl groups, methoxy groups or longer substituents etc.—allow the physical form of the achievable network to be steered towards a long chain system (thermoplastics), a relatively loosely crosslinked three-dimensional network (elastomers) or a highly crosslinked system (thermosets), such that inter alia the elasticity, the flexibility and the heat resistance of the finished crosslinked compositions can thereby be influenced. The alkoxysilane- and/or acyloxysilane-terminated polymer preferably has two end groups of the general Formula (I); however, it can also have for example three end groups of the general Formula (I).

In another preferred embodiment, X stands for a $C_1$-$C_8$ alkyl group and Y and Z each independently of one another stand for a $C_1$-$C_8$ alkoxy group, or all three groups X, Y and Z each independently of one another stand for a $C_1$-$C_8$ alkoxy group. In general, polymers that comprise di- or trialkoxysilane groups have highly reactive linking sites that enable a rapid curing, high degrees of crosslinking and thereby a good final strength. A further advantage of such polymers that comprise alkoxy groups is seen in that on curing due to the influence of moisture, i.e. by hydrolysis of the hydrolysable groups, alcohols are formed that in the released amounts are harmless and evaporate. Consequently, compositions of this type are also particularly suitable for the do-it-yourself sector. The particular advantage associated with the use of dialkoxysilyl groups is that after curing, the corresponding compositions are more elastic, softer and more flexible than the systems that comprise trialkoxysilyl groups. Consequently, they are particularly suitable for an application as a sealant. Moreover, on curing, they split off even less alcohol and are therefore of particular interest when the amount of released alcohol should be reduced.

With trialkoxysilyl groups on the other hand, a higher crosslinking degree can be achieved which is particularly advantageous when a more highly cured, stronger compound is desired after curing. Furthermore, trialkoxysilyl groups are more reactive, therefore crosslink faster and thereby lower the amount of an optionally needed catalyst. In addition they have the advantage in "cold flow", in the dimensional stability of a corresponding adhesive under the influence of force and eventual temperature effects.

In a particularly preferred embodiment, the cited $C_1$-$C_8$ alkyl group is a methyl or an ethyl group, and the $C_1$-$C_8$ alkoxy group is a methoxy or an ethoxy group. Methoxy and ethoxy groups are comparatively small hydrolysable groups with low steric hindrance, are very reactive and thereby allow a rapid cure even with low levels of catalyst. Consequently, they are of particular interest for systems, in which a rapid cure is desired, such as for example for adhesives that should exhibit a high initial adhesion.

In a particularly preferred embodiment, the cited $C_1$-$C_8$ alkyl group is a methyl group, and the $C_1$-$C_8$ alkoxy group is a methoxy group.

Compounds that contain alkoxysilyl groups possess different reactivities in chemical reactions depending on the nature of the alkyl group. In this regard, the methoxy group shows the highest reactivity among the alkoxy groups. Recourse can also be made to such silyl groups when a particularly fast cure is desired. In comparison with methoxy groups, higher aliphatic groups such as ethoxy cause an already lower reactivity of the terminal alkoxysilyl groups and can be advantageously employed for the development of graduated crosslinking rates.

Combinations of both groups open up interesting design possibilities. If for example methoxy and ethoxy are respectively selected for X and Y within the same alkoxysilyl group, then the desired reactivity of the final silyl groups can be particularly finely tuned, in the case that silyl groups with exclusively methoxy groups are found to be too reactive and the silyl groups with ethoxy groups too sluggish for the required application.

Besides methoxy and ethoxy groups, larger groups that have an inherently lower reactivity can of course also be employed as the hydrolysable groups This is particularly of interest when a retarded cure is desired, for example for adhesives that after application should still allow the adhesively bonded surfaces to be moved against one another in order to find the final position.

In another preferred embodiment of the inventive curable composition, R in Formula (I) stands for a $C_1$-$C_6$ hydrocarbon group, especially with 1 to 3 carbon atoms. The rate of cure of the composition can be influenced by the length of the hydrocarbon group that forms the link between the polymer backbone and the silyl group; this opens up further design possibilities.

R stands particularly preferably for a methylene, ethylene or propylene group. R stands quite particularly preferably for a methylene or 1,3-propylene group.

Alkoxysilane-terminated compounds having a methylene group as the linker to the polymer backbone—so called α-silanes—exhibit a particularly high reactivity of the silyl end groups; this leads to shorter setting times and thereby to a very fast cure of formulations based on such polymers. In general, an increase in length of the linking hydrocarbon chain leads to a decreased reactivity of the polymer. In particular, the γ-silanes—they comprise the unbranched propylene group as the linker—exhibit a balanced relationship between necessary reactivity (acceptable cure times) and delayed curing (open time, possibility for correction after successful adhesion).

The rate of cure of the systems can be influenced as required by means of an intentional combination of α- und γ-alkoxysilane-terminated building blocks.

In the context of a further preferred embodiment, the backbone of the alkoxysilane- and/or acyloxysilane-terminated polymer is selected from the group polyurethanes, polyethers, polyesters, polyacrylates, polymethacrylates, polyacrylamides, polymethacrylamides, polyvinyl esters, polyolefines, alkyd resins, phenol resins, vinyl polymers, styrene-butadiene copolymers, as well as copolymers of one or more of the cited backbones.

Important properties of the inventive curable composition—such as e.g. viscosity and elasticity, but also environmental resistance—can be influenced by the choice and the specific physical form of the polymer classes used for the backbone.

Polyurethanes and polyesters as well as polyethers, especially polyurethanes and polyethers, are particularly preferably employed for the backbone structure.

The use of polyurethanes and polyesters opens up a variety of application possibilities, because very different mechanical properties can be achieved with both polymer classes depending on the choice and stoichiometric ratios of the starting materials. Moreover, polyesters can be decomposed by water and bacteria and are therefore interesting for applications, in which a biological degradability is important.

Polymers that comprise polyether as the backbone have a flexible and elastic structure not only on the end groups but also in the polymer backbone. In this way compositions can be produced that possess excellent elastic properties. In this regard, polyethers are not only flexible in their backbone but also resistant at the same time. Thus for example they are neither attacked nor decomposed by water and bacteria.

In the context of the present invention, polyethers that are based on polyethylene oxide and/or polypropylene oxide are particularly preferably employed due to considerations of availability and due to their excellent elastic properties.

According to a particularly preferred embodiment of the inventive curable composition, the alkoxysilane- and/or acyloxysilane-terminated polymer has a polyether or polyurethane backbone and the linking group A is a urethane or urea group, wherein the alkoxysilane- and/or acyloxysilane-terminated polymer preferably has two end groups of the general Formula (I) which possess di- or trimethoxysilane groups, for example di- or trimethoxysilylpropyl groups and di- or trimethoxysilylmethyl groups.

The molecular weight $M_n$ of the alkoxysilane- and/or acyloxysilane-terminated polymer is preferably 4000 to 60 000, advantageously 6000 to 50 000, particularly preferably 8000 to 20 000, especially 12 000 to 20 000 g/mol. The molecular weight $M_n$ is understood to mean the number average molecular weight of the polymer. This, like the weight average molecular weight $M_w$, can be determined by gel permeation chromatography (GPC). This type of method is known to the person skilled in the art.

The molecular weights given above are particularly advantageous as the corresponding compositions possess a balanced relationship between viscosity (ease of processing), strength and elasticity. This combination is very advantageously pronounced in a molecular weight range of 8000 to 20 000, in particular from 12 000 to 20 000.

In the context of the present invention, the ratio $M_w/M_n$ of the alkoxysilane- and/or acyloxysilane-terminated polymer is less than 1.5. This is particularly true for alkoxysilane- and/or acyloxysilane-terminated polymers that have a polyether or a polyacrylate backbone. In the case of a polyurethane it is particularly preferred when the polyol components or building blocks (e.g. polyethers or hydroxyl-terminated polyacrylates) exhibit a ratio $M_w/M_n$ of less than 1.5. The ratio $M_w/M_n$, which is also referred to as the polydispersity, signifies the molecular mass distribution and thereby the different polymerization degrees of the individual chains in polydisperse polymers. The polydispersity has a value of about 2 for many polymers and polycondensates. A value of 1 signifies a strict monodispersity. In the context of the present invention, the preferred polydispersity of less than 1.5 indicates a comparatively narrow molecular weight distribution and thereby indicates the specific development of properties associated with the molecular weight, such as e.g. the viscosity. The alkoxysilane- and/or acyloxysilane-terminated polymer (or the polyol components) particularly preferably possesses a polydispersity ($M_w/M_n$) of less than 1.3.

The inventive curable compositions comprise as the additional mandatory component hollow microspheres, made of a copolymer that is obtainable by polymerizing methacrylonitrile and at least one monomer M2, selected from acrylic acid, methacrylic acid, acrylic acid alkyl esters and methacrylic acid alkyl esters, wherein the copolymer comprises maximum 5 wt. % of units incorporated from additional monomers, and is free of chlorine-containing units.

In this context, the term "free of chlorine-containing units" means that the copolymer has no structural units incorporated from monomers, whose structure comprises a chlorine atom. Therefore the copolymer itself is also chlorine-free.

Hollow microspheres are preferably employed that are made of a copolymer that is obtainable by polymerizing methacrylonitrile and at least one monomer M2, selected from acrylic acid, methacrylic acid, acrylic acid alkyl esters and methacrylic acid alkyl esters, wherein the copolymer comprises maximum 1 wt. % of units incorporated from additional monomers. The copolymers are preferably those that are exclusively formed from polymer units that result from the incorporation into the copolymer of methacrylonitrile and at least one monomer M2, selected from acrylic acid, methacrylic acid, acrylic acid alkyl esters and methacrylic acid alkyl esters.

Preferred monomers M2 are acrylic acid, methacrylic acid, $C_{1-20}$ alkyl esters of acrylic acid and $C_{1-20}$ alkyl esters of methacrylic acid.

Monomer M2 is particularly preferably selected from acrylic acid, methacrylic acid, acrylic acid methyl ester, methacrylic acid methyl ester, acrylic acid ethyl ester, methacrylic acid ethyl ester, acrylic acid propyl ester, methacrylic acid propyl ester, acrylic acid isopropyl ester, methacrylic acid isopropyl ester, acrylic acid octyl ester, methacrylic acid octyl ester, acrylic acid decyl ester, methacrylic acid dodecyl ester, acrylic acid lauryl ester, methacrylic acid lauryl ester, acrylic acid myristyl ester, methacrylic acid myristyl ester, acrylic acid cetyl ester, methacrylic acid cetyl ester, acrylic acid stearyl ester, methacrylic acid stearyl ester, acrylic acid eicosyl ester and methacrylic acid eicosyl ester, quite particularly preferably from acrylic acid, methacrylic acid, acrylic acid methyl ester, methacrylic acid methyl ester, acrylic acid ethyl ester, methacrylic acid ethyl ester, acrylic acid lauryl ester, methacrylic acid lauryl ester, acrylic acid stearyl ester and methacrylic acid stearyl ester.

The monomer M2 is quite particularly preferably acrylic acid, methacrylic acid, acrylic acid methyl ester and/or methacrylic acid methyl ester, in particular methacrylic acid methyl ester.

Accordingly, the inventive curable compositions particularly preferably comprise hollow microspheres that are made of a methacrylonitrile-methacrylic acid methyl ester copolymer.

In this regard, it is particularly preferred that gaseous or volatile hydrocarbons, such as for example propane, n-butane, isobutene, n-pentane, isopentane or neopentane, are enclosed in the hollow microspheres Hollow microspheres that comprise isopentane are particularly preferred.

The inventive curable composition preferably comprises the hollow microspheres in an amount of 0.01 to 5 wt. %, particularly preferably 0.1 to 2.5 wt. %, quite particularly preferably 0.2 to 1 wt. %, each based on the total weight of the curable composition.

In addition to the cited hollow microspheres, the inventive compositions can comprise one or more additional fillers.

Exemplary suitable additional fillers are chalk, lime powder, precipitated and/or pyrogenic silicas, zeolites, bentonites, magnesium carbonate, diatomaceous earth, alumina, clay, talc, titanium oxide, iron oxide, sand, quartz, flint, mica, glass powder and other ground mineral substances as well as carbon black and graphite. Moreover, organic fillers can also be added, especially wood fibers, wood flour, sawdust, cellulose, cotton, pulp, cotton, hogged chips, chopped straw, chaff, other chopped fibers and ground walnut shells. Furthermore, short fibers such as glass fiber, glass filament, polyacrylonitrile, carbon fiber, Kevlar fiber or also polyethylene fibers. Aluminum powder is also a suitable filler.

Moreover, additional suitable fillers are hollow microspheres with a mineral shell or a plastic shell, which differ from the abovementioned imperatively comprised specific hollow microspheres. These can be hollow glass microspheres, for example that are commercially available under the trade names Glass Bubbles®. Hollow microspheres based on plastic are e.g. available under the trade names Expancel® or Dualite®. These are composed of inorganic or organic substances, each with a diameter of 1 mm or less, preferably 500 μm or less.

The fillers are preferably added in an amount of 1 to 200 parts by weight, based on 100 parts by weight of the alkoxysilane- and/or acyloxysilane-terminated polymer. Weight fractions of 5 to 125, especially 10 to 60 parts by weight, are preferred, based on 100 parts by weight of the alkoxysilane- and/or acyloxysilane-terminated polymer. A single filler or a combination of a plurality of fillers can be used. Each of these quantitative data refer to the total content of fillers in the curable compositions, i.e. to the sum of the fractions of the abovementioned imperatively comprised specific hollow microspheres and to additional fillers.

For some applications, fillers are preferred that lend thixotropy to the preparations. Fillers of this type are also described as rheological additives or auxiliaries, e.g. silica gels, aerosils, charcoal, carbon black or swellable plastics like PVC. Furthermore, the following organic additives can be employed as rheology modifiers: hydrogenated castor oil, fatty acid amides, urea derivatives and polyurea derivatives.

In a particular embodiment of the inventive curable composition, this comprises a highly dispersed silica with a BET surface of 10 to 90 $m^2/g$, in particular 35 to 65 $m^2/g$, as the additional filler. The use of a silica of this type does not significantly increase the viscosity of the composition but contributes to reinforce the cured preparation. This reinforcement improves e.g. the initial strengths, tensile shear strengths and the adhesion of the adhesives, sealants or coatings.

A highly dispersed silica with a BET surface of 45 to 55 $m^2/g$ is preferably added, in particular with a BET surface of about 50 $m^2/g$. Such silicas have the additional advantage of a 30 to 50% shorter incorporation time in comparison with silicas with a higher BET surface. Another advantage consists in that the cited highly dispersed silica can be incorporated into the inventive curable composition in a considerably higher concentration, without impairing the flow properties of the composition.

It is likewise conceivable to add pyrogenic and/or precipitated silicas with a higher BET surface area, advantageously with 100-250 $m^2/g$, in particular 110-170 $m^2/g$, as the additional filler. However, the incorporation of such silicas takes a comparatively long time and is therefore more cost intensive. Moreover, considerable amounts of air are introduced into the product and must be removed again in a time-consuming and tedious manner. Having said that, due to the higher BET surface the effect of a reinforcement of the cured preparation can be achieved with a lower weight fraction of silica. In this manner additional substances can be incorporated in order to improve the inventive preparation in regard to other requirements.

In a preferred embodiment of the inventive curable composition, this comprises at least one additional filler, preferably a chalk, wherein this can be optionally coated.

In principle all components that are known for this purpose can be added as the additional filler. The inventive curable compositions preferably, however, do not comprise hollow microspheres of vinylidene chloride polymers, particularly preferably they do not comprise any chlorine-containing filler at all. This ensures that on decomposing or burning the inventive curable compositions or cured products manufactured therefrom, no environmental and/or health hazardous chlorine-containing compounds can be formed.

The inventive curable compositions can additionally comprise all auxiliaries and adjuvants and other additives that are usually added to such compositions, especially to silane crosslinking adhesives, sealants or coatings. These can provide the compositions with improved elastic properties, improved resilience, improved processability, a sufficiently long processing time, fast rates of total cure and low residual tackiness. These auxiliaries and adjuvants include for example adhesion promoters, catalysts as well as plasticizers. Moreover, the compositions can comprise for example stabilizers, antioxidants, reactive diluents, drying agents, UV stabilizers, anti-aging agents, rheological auxiliaries, color pigments or color pastes, fungicides, flame retardants and/or optionally to a limited extent solvents as the additional additives.

Thus for example the compositions can comprise drying agent. All compounds that react with water to afford groups that are inert towards the reactive groups present in the composition and thereby effect the lowest possible changes in its molecular weight, are suitable as drying agents. In addition, the reactivity of the drying agent towards the moisture that ingressed into the composition must be higher than the reactivity of the end groups of the polymer that carries silyl groups present in the inventive compositions.

Isocyanates for example are suitable drying agents. Silanes can also be employed as drying agents, for example vinylsilanes, such as 3-vinylpropyltriethoxysilane, benzamidosilanes, such as bis(n-methylbenzamido)methylethoxysilane, or carbamatosilanes, such as carbamatomethyltrimethoxysilane. The use of methyl-, ethyl-, vinyl trimethoxysilane or other alkyl trimethoxysilanes, tetramethyl-, tetraethoxy- or ethylethoxysilan is also possible. Vinyl trimethoxysilane and tetraethoxysilane are preferred here.

Finally, alkyl orthoformates or alkyl orthoacetates can be employed as the drying agent, for example methyl or ethyl orthoformate, methyl or ethyl orthoacetate.

If drying agents are added, then they are preferably employed in an amount of up to 10 parts by weight, based on 100 parts by weight of the alkoxysilane- and/or acyloxysilane-terminated polymer.

According to a preferred embodiment of the inventive curable composition, this comprises a plasticizer.

A plasticizer is understood to mean a substance that reduces the viscosity of a composition and thereby facilitates the processability and moreover improves the flexibility and elongation behavior of the composition. One or more plasticizers can be used.

The plasticizer is preferably selected from a fatty acid ester, a dicarboxylic acid ester, an ester of a fatty acid carrying OH-groups or of an epoxidized fatty acid, a fat, an ester of glycolic acid, an ester of phthalic acid, an ester of benzoic acid, an ester of phosphoric acid, an ester of sulfonic acid, an ester of trimellitic acid, an epoxidized plasticizer, a polyether plasticizer, a polystyrene, a hydrocarbon plasticizer and a chlorinated paraffin, as well as mixtures of two or more thereof. These plasticizers particularly advantageously combine their actual functional facilitation of processability, improved flexibility and elongation behavior of the compositions—with a suitable development of additional advantageous properties. By the judicious choice of one of these plasticizers or one specific combination, additional advantageous properties of the inventive curable compositions can be realized, e.g. gel behavior of the polymer, cold temperature elasticity or cold temperature resistance or even antistatic properties.

Suitable examples from the group of the phthalic acid esters are dioctyl phthalate, dibutyl phthalate, diisoundecyl phthalate, diisononyl phthalate or butylbenzyl phthalate;, from the adipates dioctyl adipate, diisodecyl adipate, furthermore diisodecyl succinate, dibutyl sebacate or butyl oleate.

Among the polyether plasticizers, end-blocked polyethylene glycols are preferably employed, for example polyethylene- or polypropylene glycol di-$C_{1-4}$ alkyl ethers, particularly the dimethyl- or diethyl ethers of diethylene glycol or dipropylene glycol, as well as mixtures of two or more thereof.

Similarly suitable exemplary plasticizers are esters of abietic acid, butyric acid esters, acetic acid esters, propionic acid esters, thiobutyric acid esters, citric acid esters, esters based on nitrocellulose and polyvinyl acetate, as well as mixtures of two or more thereof. The asymmetric esters of adipic acid monooctyl ester with 2-ethylhexanol (Edenol DOA, Cognis Deutschland GmbH, Düsseldorf) are also suitable, for example.

Moreover, the pure or mixed ethers of monofunctional, linear or branched $C_{4-16}$ alcohols or mixtures of two or more different ethers of such alcohols, for example dioctyl ether (available as Cetiol OE, Cognis, Düsseldorf) are also suitable as plasticizers.

Likewise in the context of the present invention, suitable plasticizers are diurethanes that can be manufactured, for example, by treating diols having OH end groups with monofunctional isocyanates, the stoichiometry being chosen such that essentially all free OH groups react. Optionally, excess isocyanate can be subsequently removed from the reaction mixture by distillation, for example. A further method for manufacturing diurethanes consists in treating monohydric alcohols with diisocyanates, wherein all possible NCO groups react.

The inventive curable compositions can comprise up to 400 parts by weight plasticizer based on 100 parts by weight of the alkoxysilane- and/or acyloxysilane-terminated polymer. Weight fractions of 5 to 150, especially 50 to 125 parts by weight plasticizer are preferred, based on 100 parts by weight of the alkoxysilane- and/or acyloxysilane-terminated polymer.

If the viscosity of the inventive curable composition is too high for certain applications then the viscosity can also be easily and conveniently reduced by the use of a reactive diluent without causing de-mixing phenomena (e.g. plasticizer migration) in the cured compound.

The reactive diluent preferably possesses at least one functional group that after the application reacts for example with moisture or atmospheric oxygen. Examples of such groups are silyl groups, isocyanate groups, vinylic unsaturated groups and polyunsaturated systems.

As reactive diluents, all compounds that are miscible with and reduce the viscosity of the inventive curable composition, and that carry at least one group that is reactive with the binder can be employed, alone or as a combination of a plurality of compounds.

The viscosity of the reactive diluent is preferably less than 20 000 mPas, particularly preferably about 1 to 6000 mPas, quite particularly preferably 100 to 1000 mPas (Brookfield RVT, 23° C., spindel 7, 10 rpm).

The following exemplary substances can be employed as the reactive diluent: polyalkylene glycols reacted with isocyanato silanes (e.g. Synalox 100-50B, DOW), alkyl trimethoxysilane, alkyl triethoxysilane, like methyl trimethoxysilane, methyltriethoxysilane, as well as vinyl trimethoxysilane, phenyl trimethoxysilane, phenyl triethoxysilane, octyl trimethoxysilane, tetraethoxysilane, vinyl dimethoxymethylsilane, vinyl triethoxysilane, vinyl triacetoxysilane, isooctyl trimethoxysilane, isooctyl triethoxysilane, N-trimethoxysilylmethyl-O-methyl carbamate, N-dimethoxy(methyl)silylmethyl-O-methyl carbamate, hexadecyl trimethoxysilane, 3-octanoylthio-1-propyl triethoxysilane and their partially hydrolyzed compounds.

Furthermore, the following polymers from Kaneka Corp. can also be employed as the reactive diluent: MS S203H, MS S303H, MS SAT 010, and MS SAX 350.

Polymers that can be produced by grafting a vinyl silane onto an organic backbone or by reaction with polyol, polyisocyanate and alkoxysilane are also suitable as the reactive diluent.

A polyol is understood to mean a compound that comprises two or more OH groups in the molecule. The OH groups can be primary as well as secondary.

Suitable exemplary polyols are aliphatic diols such as ethylene glycol, propylene glycol and higher glycols, as well as other polyfunctional alcohols. The polyols can additionally comprise further functional groups such as e.g. esters, carbonates, amides.

For manufacturing a reactive diluent by treating polyols with polyisocyanate and alkoxysilane, the appropriate polyol component is treated with an isocyanate that is at least difunctional. Fundamentally, each isocyanate having at least two isocyanate groups can be considered as the at least difunctional isocyanate; however, in the context of the present invention, compounds with two to four isocyanate groups, particularly with two isocyanate groups, are generally preferred. The alkoxysilanes preferably possess alkoxysilane groups with di- and trialkoxysilyl groups.

Exemplary suitable polyisocyanates for manufacturing reactive diluents are ethylene diisocyanate, 1,4-tetramethylene diisocyanate, 1,4-tetramethoxybutane diisocyanate, 1,6-hexamethylene diisocyanate (HDI), cyclobutane-1,3-diisocyanate, cyclohexane-1,3 and -1,4-diisocyanate, bis(2-isocyanato-ethyl) fumarate, as well as mixtures of two or more thereof, 1-isocyanato-3,3,5-trimethyl-5-isocyanatomethylcyclohexane (isophorone diisocyanate, IPDI), 2,4- and 2,6-hexahydrotoluene diisocyanate, hexahydro-1,3- or -1,4-phenylene diisocyanate, benzidine diisocyanate, naphthaline-1,5-diisocyanate, 1,6-diisocyanato-2,2,4-trimethylhexane, 1,6-diisocyanato-2,4,4-trimethylhexane, xylylene diisocyanate (XDI), tetramethylxylylene diisocyanate (TMXDI), 1,3- and 1,4-phenylene diisocyanate, 2,4- or 2,6-toluene diisocyanate (TDI), 2,4'-diphenylmethane diisocyanate, 2,2'-diphenylmethane diisocyanate or 4,4'-diphenylmethane diisocyanate (MDI) or their partially or completely hydrogenated cycloalkyl derivatives, for example completely hydrogenated MDI (H12-MDI), alkyl substituted diphenylmethane diisocyanates, for example mono-, di-, tri- or tetraalkyldiphenylmethane diisocyanates as well as their partially or completely hydrogenated cycloalkyl derivatives, 4,4'-diisocyanatophenylperfluorethane, phthalic acid bis-isocyanato ethylester, 1-chloromethylphenyl-2,4- or -2,6-diisocyanates, 1-bromomethylphenyl-2,4- or -2,6-diisocyanates, 3,3-bis-chloromethyl ether 4,4'-diphenyl diisocyanates, sulfur-containing diisocyanates, as are obtained by treating 2 mol diisocyanate with 1 mol of thiodiglycol or dihydroxydihexylsulfide, the di- and triisocyanates of the di- and trimer fatty acids, or mixtures of two or more of the cited diisocyanates.

Also, tri or higher functional isocyanates, such as are obtained, for example by oligomerizing diisocyanates, in particular by oligomerizing the above cited isocyanates, can be employed as the polyisocyanates. Examples of such tri- and higher functional polyisocyanates are the triisocyanurates of HDI or IPDI or their mixtures or their mixed triisocyanurates as well as polyphenylmethylene polyisocyanate, as is obtained by phosgenating aniline formaldehyde condensation products.

The reactive diluents can be employed in the inventive curable compositions in the same weight fractions as the plasticizer.

The abovementioned reactive diluents can also act as (additional) drying agents, in so far as their molecular weight (Mn) is less than about 5000 g/mol and they possess end groups, whose reactivity towards ingressed moisture is at least just as high, preferably higher, than the reactivity of the reactive groups of the silyl group-carrying polymers comprised in the inventive compositions.

The viscosity of the inventive curable compositions can also be reduced by adding solvent in addition to, or instead of, a reactive diluent.

Suitable solvents are aliphatic or aromatic hydrocarbons, halogenated hydrocarbons, alcohols, ketones, ethers, esters, ester alcohols, keto alcohols, keto esters and ether esters. However, alcohols are preferably employed as in this case the shelf life increases. $C_1$-$C_{10}$ alcohols, particularly methanol, ethanol, i-propanol, isoamyl alcohol and hexanol, are particularly preferred.

Moreover, the inventive curable composition can comprise one or more adhesion promoters. An adhesion promoter is understood to mean a substance that improves the adhesion properties of adhesive layers on surfaces.

Conventional adhesion promoters (tackifiers) that are known to the person skilled in the art can be employed individually or as a combination of a plurality of compounds. Exemplary suitable tackifiers are resins, terpene oligomers, coumarone/indene resins, aliphatic, petrochemical resins and modified phenolic resins. In the context of the present invention, hydrocarbon resins, for example are suitable, such as those obtained by polymerizing terpenes, principally α- or β-pinenes, dipentenes or limonenes. Generally, these monomers are cationically polymerized by initiation with Friedel-Crafts catalysts. Copolymers of terpenes and other monomers, for example styrene, α-methyl styrene, isoprene and the like, are also counted among the terpene resins. The cited resins are used, for example, as adhesion promoters for pressure-sensitive adhesives and coating materials. The terpene-phenol resins, which are manufactured by acid catalyzed addition of phenols to terpenes or colophonium are also suitable. Terpene-phenol resins are soluble in most organic solvents and oils and are miscible with other resins, waxes and rubber. In the context of the present invention, the colophonium resins and their derivatives, for example their esters or alcohols, are likewise suitable in the above sense as adhesion promoters.

Silane adhesion promoters are particularly suitable, particularly alkoxysilanes that contain a (additional) functional group such as for example an amino group, a mercapto group, an epoxy group, a carboxyl group, a vinyl group, an isocyanato group, an isocyanurate group or a halogen. Examples are γ-mercaptopropyl trimethoxysilane, γ-mercaptopropyl triethoxysilane, γ-mercaptopropylmethyldimethoxysilane, γ-glycidoxypropyl trimethoxysilane, γ-glycidoxypropyl triethoxysilane, γ-glycidoxypropylmethyldimethoxysilane, β-carboxyethyl triethoxysilane, β-carboxyethylphenylbis(2-methoxyethoxy)silane, n-β-(carboxymethypaminoethyl-γ-aminopropyl trimethoxysilane, vinyl trimethoxysilane, vinyl triethoxysilane, γ-acroyloxypropylmethyltriethoxysilane, γ-isocyanatopropyl trimethoxysilane, γ-isocyanatopropyl triethoxysilane, γ-isocyanatopropylmethyldiethoxysilane, γ-isocyanatopropylmethyldimethoxysilane, tris(trimethoxysilyl)isocyanurate and γ-chloropropyl trimethoxysilane.

Particularly preferred adhesion promoters are in particular aminosilanes (amino functional alkoxysilanes or aminoalkylalkoxysilanes), such as e.g. γ-aminopropyl trimethoxysilane, γ-aminopropyl triethoxysilane, γ-aminopropyl triisopropoxysilane, γ-aminopropylmethyldimethoxysilane, γ-aminopropylmethyldiethoxysilane, γ-(2-aminoethyl)-3-aminopropyl trimethoxysilane, γ-(2-aminoethyl)aminopropylmethyldimethoxysilane, γ-(2-aminoethyl)aminopropyl triethoxysilane, γ-(2-aminoethyl)aminopropylmethyldiethoxysilane, γ-(2-aminoethyl)aminopropyl triisopropoxysilane, N-phenyl-γ-aminopropyl trimethoxysilane, N-benzyl-γ-aminopropyl trimethoxysilane, and N-vinylbenzyl-γ-aminopropyl triethoxysilane, or oligomeric aminosilanes, such as e.g. aminoalkyl group modified alkylpolysiloxanes (Dynasylan 1146).

A silane of the general Formula (II) is additionally preferred as the adhesion promoter

$$R^1R^2N\text{---}R'\text{---}SiX'Y'Z' \qquad (II),$$

in which
$R^1$ and $R^2$ independently of one another are hydrogen or $C_1$-$C_8$ alkyl groups,
R' is a divalent $C_1$-$C_{12}$ hydrocarbon group that optionally contains a heteroatom, and
X', Y', Z' independently of each other are $C_1$-$C_8$ alkyl, $C_1$-$C_8$ alkoxy or $C_1$-$C_8$ acyloxy groups, wherein at least one of the groups is a $C_1$-$C_8$ alkoxy or $C_1$-$C_8$ acyloxy group.

These types of compounds inherently possess a high affinity to the binding polymer components of the inventive curable composition, but also to a wide range of polar as well as non-polar surfaces and therefore contribute to the formation of a particularly stable adhesion between the adhesive or sealing composition and the respective substrates to be adhesively bonded or sealed.

The linking group R' can be a straight chain or branched or cyclic, substituted or un-substituted alkenyl group, for example. The hydrocarbon group can be saturated or unsaturated. Nitrogen (N) or oxygen (O) are optionally comprised therein as the heteroatom. R' is preferably a $C_{1-6}$ hydrocarbon group, in particular a $C_{1-3}$ group, for example methylene or n-propylene.

X', Y' and Z' independently of each other are preferably a methyl, an ethyl, a methoxy or an ethoxy group. X', Y' and Z' are particularly preferably alkoxy groups, especially methoxy groups. The —SiX'Y'Z' group is quite particularly preferably a trimethoxysilyl or dimethoxymethylsilyl group. When X', Y' and/or Z' are an acyloxy group, then this can be the acetoxy group —OCO—$CH_3$, for example.

The inventive curable compositions preferably comprise the adhesion promoter in an amount of 0.1 to 25 parts by weight, based on 100 parts by weight of the alkoxysilaneand/or acyloxysilane-terminated polymer. Weight fractions of 0.5 to 10, especially 1 to 5 parts by weight of adhesion promoter are preferred, based on 100 parts by weight of the alkoxysilane- and/or acyloxysilane-terminated polymer.

Moreover, the inventive curable composition can contain a catalyst as an additional component (silane condensation catalyst or cure or crosslinking catalyst). Exemplary suitable crosslinking catalysts for controlling the cure rate of the inventive compositions are organometallic compounds such as iron or tin compounds, in particular the 1,3-dicarbonyl compounds of iron such as e.g. iron(III)acetylacetonate or of divalent or tetravalent tin such as for example dibutyltin-bisacetylacetonate, the dialkyltin(IV) dicarboxylates—e.g. dibutyltin dilaurate, dibutyltin maleate or dibutyltin diacetate—or the corresponding dialkoxylates, e.g. dibutyltin dimethoxide. The organotin compounds are particularly well tried and tested and easily obtainable catalysts with excellent activity. However, some organotins have been criticized due to physiological and ecological concerns. Therefore, in another preferred embodiment the inventive composition is tin-free. Nevertheless, the compositions can be easily and quickly cured with the optional use of alternative catalysts without any loss in quality.

Boron halides such as boron trifluoride, boron trichloride, boron tribromide, boron triiodide or mixed boron halides can be employed as alternative cure catalysts. Boron trifluoride complexes, such as e.g. boron trifluoride diethyl etherate that are more easily handleable then the gaseous boron trihalides, are particularly preferred.

Furthermore, amines, nitrogen heterocycles and guanidine derivatives are generally suitable for the catalysis. A particularly preferred catalyst from this group is 1,8-diazabicyclo-[5.4.0]-undec-7-ene (DBU).

Moreover, titanium, aluminum and zirconium compounds or mixtures of one or more catalysts from one or more of the just mentioned groups are advantageously employed as the catalysts. On the one hand the addition of tin compounds can also be avoided in this manner, on the other hand a better adhesion to weakly adhering organic surfaces such as e.g. acrylates can be achieved. Among the titanium, aluminum and zirconium catalysts, the titanium catalysts are preferably employed as they provide the best cure results.

Compounds that possess hydroxyl groups and/or substituted or un-substituted alkoxy groups are suitable titanium catalysts, thus titanium alkoxides of the general Formula $$Ti(OR^Z)_4,$$

wherein $R^z$ is an organic group, preferably a substituted or un-substituted hydrocarbon group containing 1 to 20 carbon atoms, and the 4 alkoxy groups —$OR^z$ are the same or different. Furthermore, one or more of the groups —$OR^z$ can be replaced by acyloxy groups —$OCOR^z$.

Titanium alkoxides, in which one or more alkoxy groups are replaced by a hydroxyl group or halogen atoms, are likewise suitable as the titanium catalysts.

Titanium chelate complexes can also be employed.

Aluminum catalysts can also be employed as curing catalysts, e.g. aluminum alkoxides $$Al(OR^z)_3,$$

wherein $R^z$ has the above meaning, i.e. an organic group, preferably a substituted or un-substituted hydrocarbon group containing 1 to 20 carbon atoms, and the three $R^z$ groups are the same or different. With the aluminum alkoxides, one or more of the alkoxy groups can also be replaced by acyloxy groups —$OC(O)R^z$.

Further, aluminum alkoxides can be employed, in which one or more alkoxy groups are replaced by a hydroxyl group or halogen atoms.

Among the described aluminum catalysts, the pure aluminum alcoholates are preferred due to their moisture stability and the curability of the mixtures, to which they are added. Moreover, aluminum chelate complexes are preferred.

Suitable zirconium catalysts are e.g.: tetramethoxyzirconium, tetraethoxyzirconium.

Diisopropoxyzirconiumbis(ethyl acetoacetate), triisopropoxyzirconium(ethyl acetoacetate) and isopropoxyzirconiumtris(ethyl acetoacetate) are quite particularly preferably employed.

Zirconium acylates, for example, can also be employed

Halogenated zirconium catalysts can also be employed.

Zirconium chelate complexes can also be employed.

In addition, metal salts of carboxylic acids or even a mixture of a plurality of such salts can be used as cure catalysts, wherein these are selected from carboxylates of the following metals: calcium, vanadium, iron, zinc, titanium, potassium, barium, manganese, nickel, cobalt and/or zirconium.

The calcium, vanadium, iron, zinc, titanium, potassium, barium, manganese and zirconium carboxylates are preferred carboxylates because they exhibit a high activity. Calcium, vanadium, iron, zinc, titanium and zirconium carboxylates are particularly preferred. Iron and titanium carboxylates are quite particularly preferred.

The catalyst is preferably added in an amount of 0.001 to about 10 parts by weight, based on 100 parts by weight of the alkoxysilane- and/or acyloxysilane-terminated polymer. Weight fractions of 0.01 to 1, especially 0.03 to 0.5, particularly preferably less than 0.1 parts by weight catalyst are preferred, based on 100 parts by weight of the alkoxysilane- and/or acyloxysilane-terminated polymer.

Mixtures of a plurality of catalysts can also be employed in order to combine advantageous effects.

In a preferred embodiment of the invention, the curable compositions comprise at least one of the abovementioned catalysts in addition to at least one alkoxysilane- and/or acyloxysilane-terminated polymer and the specific hollow microspheres. They particularly preferably additionally comprise at least one plasticizer and moreover quite particularly preferably at least one adhesion promoter. In this regard, the quantities and preferred quantities, in which these ingredients are comprised, correspond to the above statements in the description of the respective ingredient.

The inventive curable composition can comprise antioxidants as an additional additive. The amount of the antioxidants is preferably up to about 7 parts by weight, based on 100 parts by weight of the alkoxysilane- and/or acyloxysilane-terminated polymer, particularly up to about 5 parts by weight.

Moreover, the composition can comprise UV stabilizers (UV absorbers). The amount of the UV stabilizers is preferably up to about 2 parts by weight, based on 100 parts by weight of the alkoxysilane- and/or acyloxysilane-terminated polymer, particularly about 1 part by weight. The hindered amine light stabilizers (HALS) are particularly suited as the UV stabilizers. In the context of the invention, it is particularly preferred if a UV stabilizer is employed that has a silane group and becomes attached to the end product during crosslinking or curing. The products Lowilite 75 and Lowilite 77 (Great Lakes, USA) are particularly suitable for this. Furthermore, benzotriazoles, benzophenones, benzoates, cyanoacrylates, acrylates, sterically hindered phenols, phosphorus and/or sulfur can also be added.

The inventive curable compositions can further comprise up to 10 parts by weight of additional additives, based on 100 parts by weight of the alkoxysilane- and/or acyloxysilane-terminated polymer. Exemplary additional additives include pigments, stabilizers, anti-aging agents, fungicides and flame retardants.

In another preferred embodiment of the inventive curable composition, this comprises
- 100 parts by weight of the alkoxysilane- and/or acyloxysilane-terminated polymer,
- 0.5-10 parts by weight of adhesion promoter,
- 5-150 parts by weight of plasticizer,
- 0.01-1 part by weight of catalyst,
- 5-125 parts by weight of filler,
- 0.1-10 parts by weight of drying agent, as well as
- 0-10 parts by weight of other additives, such as pigments, stabilizers, UV absorbers, anti-aging agents, antioxidants, rheological aids, diluents or reactive diluents and/or solvents, as well as fungicides and flame retardants, wherein the filler comprises the hollow microspheres, made of a copolymer that is obtainable by polymerizing methacrylonitrile and at least one monomer M2, selected from acrylic acid, methacrylic acid, acrylic acid alkyl esters and methacrylic acid alkyl esters, wherein the copolymer comprises maximum 5 wt. % of units incorporated from additional monomers, and is free of chlorine-containing units.

Compositions based on these weight proportions afford easily processable adhesives, sealants or coating materials that simultaneously possess a good strength and elasticity. The properties can be precisely determined for the respective application field by specifically weighting the contents of the composition.

In regard to preferred representatives of the individual ingredients and to their quantities, the above statement applies correspondingly.

In another preferred embodiment, the viscosity of the curable composition is 5000 to 500 000 mPas (measured with a Brookfield viscosimeter type RVDVII +, spindle no. 7, 10 rpm at 23° C.). The viscosity is particularly preferably 50 000 to 300 000 mPas. These viscosities enable a good processability of the compositions.

Another subject matter of the invention is a process for manufacturing an inventive curable composition, in which process are mixed together a) an alkoxysilane- and/or acyloxysilane-terminated polymer containing at least one end group of the general Formula (I)

-$A_n$-R—SiXYZ (I), in which
- A stands for a divalent binding group,
- R stands for a divalent $C_1$-$C_{12}$ hydrocarbon group that optionally contains a heteroatom, and
- X, Y, Z each independently of one another stand for a $C_1$-$C_8$ alkyl, $C_1$-$C_8$ alkoxy or $C_1$-$C_8$ acyloxy group, wherein at least one of the groups X, Y, Z is a $C_1$-$C_8$ alkoxy or $C_1$-$C_8$ acyloxy group, and
- n stands for 0 or 1, and b) hollow microspheres, made of a copolymer that is obtainable by polymerizing methacrylonitrile and at least one monomer M2, selected from acrylic acid, methacrylic acid, acrylic acid alkyl esters and methacrylic acid alkyl esters, wherein the copolymer comprises maximum 5 wt. % of units incorporated from additional monomers, and is free of chlorine-containing units, as well as optional adhesion promoters, catalysts, drying agents, plasticizers, additional fillers, and/or additional additives.

In this regard, the individual components or ingredients of the inventive curable composition, as well as the individual groups or substituents and indices are defined as listed above.

The following sequence, which is not mandatory, however, is preferably selected for the inventive process for manufacturing a curable composition: Firstly, when present, adhesion promoter together with plasticizer are provided and blended with drying agent. The alkoxysilane- and/or acyloxysilane-terminated polymer is then added with stirring, before adding the hollow microspheres and optional additional fillers or additives also with stirring. Finally, the catalyst is optionally added with stirring. The process is preferably carried out under the best possible exclusion of moisture, by, for example working under an atmosphere of inert gas.

The inventive curable compositions preferably concern silane-crosslinking adhesives, sealants or coating materials.

Another subject matter of the invention is therefore the use of an inventive curable composition or of a curable composition, manufactured according to the previously described inventive process, as an adhesive for adhesively bonding plastics, metals, glass, ceramics, wood, wood-based materials, paper, paper-based materials, rubber and textiles or as a sealant for sealing buildings or parts thereof, especially for sealing joints.

In these types of applications the inventive curable composition can be processed and applied with ease and provides a good strength after curing, wherein the cured products are characterized by a low modulus with a simultaneously high elongation.

The invention is described below in more detail by means of examples, wherein the examples serve solely to illustrate the invention and do not represent any limitations of the inventive concept.

EXAMPLES

Unless otherwise stated, the quantities listed below are understood to be in weight per cent.

Sealants

Sealants with a composition according to Table 1 were produced. The composition B1 is an inventive curable composition. The comparative composition V1 is not inventive. It does not comprise hollow microspheres that are free of chlorine-containing units.

TABLE 1

| Raw material no. | Trade name | Raw material name | B1 [%] | V1 [%] |
|---|---|---|---|---|
| 1 |  | Silane-terminated organic polymer | 19.85 | 19.85 |
| 2 | Jayflex DIUP | Diisoundecyl phthalate | 27.80 | 27.80 |
| 3 | Socal U1S2 | Calcium carbonate, coated with stearic acid | 42.25 | 42.25 |

TABLE 1-continued

| Raw material no. | Trade name | Raw material name | B1 [%] | V1 [%] |
|---|---|---|---|---|
| 4 | Expancel 920DE 40 d 30 | Hollow microspheres of a copolymer of methacrylonitrile and methyl methacrylate, containing isobutane | 0.45 | — |
| 5 | Expancel 461 DET 40 d 25 | Hollow microspheres of a terpolymer of vinylidene chloride, methacrylonitrile and methyl methacrylate, containing isobutane | — | 0.45 |
| 6 | Titanium dioxide | Titanium dioxide | 3.00 | 3.00 |
| 7 | Disparlon 6500 | Synthetic polyamide wax | 3.50 | 3.50 |
| 8 | Eversorb 74 | 2-(2'-hydroxy-3',5'-di-tert-amylphenyl)-benzotriazole | 0.30 | 0.30 |
| 9 | Eversorb 90 | Bis(2,2,6,6-tetramethyl-4-piperidyl) sebacate | 0.30 | 0.30 |
| 10 | Geniosil XL 10 | Vinyl trimethoxysilane | 1.50 | 1.50 |
| 11 | Geniosil GF96 | (3-aminopropyl)trimethoxysilane | 0.50 | 0.50 |
| 12 | Dynasylan 1146 | Alkylpolysiloxane modified with aminoalkyl groups | 0.50 | 0.50 |
| 13 | Metatin catalyst 740 | Di-n-butyltin ketonate | 0.05 | 0.05 |

Manufacturing Guidelines for Raw Material No. 1

The silane-terminated organic polymer was manufactured as follows: 282 g (15 mmol) Polypropylene glycol 18000 (OHZ=6.0) were dried at 100° C. under vacuum in a 500 ml three-necked flask. Under a nitrogen atmosphere were added 0.1 g Borchi Kat 24 (bismuth 2-ethylhexanoate) at 80° C. and then 7.2 g (32 mmol) 3-isocyanatopropyltrimethoxysilane (NCO-content =18.4%). After stirring for one hour at 80° C. the resulting polymer was cooled and then treated with 6 g vinyl trimethoxysilane.

Manufacturing Guidelines for the Sealants of Table 1

The sealants B1 and V1 were manufactured in a planetary dissolver mixer according to the following procedure:
1. Weigh out raw material 1
2. Weigh out raw material 2
3. Blend at room temperature
4. Weigh out raw materials 3, 6, 7, 8 and 9 and blend at room temperature for 5 minutes
5. Weigh out hollow microspheres (raw materials 4 or 5) and blend at room temperature for 3 minutes
6. Draw a vacuum
7. Heat under vacuum with stirring to ca. 85° C.
8. Stir under vacuum at ca. 85° C. for 20 minutes
9. Cool down to ca. 55° C.
10. Weigh out raw material 10
11. Blend for 3 minutes
12. Weigh out raw materials 11 and 12
13. Blend for 2 minutes
14. Weigh out raw material 13
15. Draw a vacuum
16. Blend under vacuum for 10 minutes Mechanical Properties Specimens were produced from the sealants from examples B1 and V1 and the modulus at 100% elongation and the elongation at break were determined. The results are presented in Table 2.

The specimens were produced and the tensile testing were carried out at 23° C. in accordance with DIN EN ISO 8339-A with anodized aluminum as the support material.

TABLE 2

| Sealant | Modulus [N/mm$^2$] | Elongation at break [%] |
|---|---|---|
| B1 | 0.7 | 244 |
| V1 | 0.8 | 170 |

As can be seen in Table 2, the use of hollow microspheres of a methacrylonitrile/methyl methacrylate copolymer that is free of chlorine-containing units enables sealants to be obtained that are characterized by a significantly improved elongation at break for a slightly improved modulus.

What is claimed is:

1. A curable composition, comprising
   a. an alkoxysilane- and/or acyloxysilane-terminated polymer containing at least one end group of the general Formula (I)

   -A$_n$-R—SIXYZ (I), in which
   A stands for a divalent binding group,
   R stands for a divalent $C_1$-$C_{12}$ hydrocarbon group that optionally contains a heteroatom,
   X, Y, Z each independently of one another stand for a $C_1$-$C_8$ alkyl, $C_1$-$C_8$ alkoxy or $C_1$-$C_8$ acyloxy group, wherein at least one of the groups X, Y, Z is a $C_1$-$C_8$ alkoxy or $C_1$-$C_8$ acyloxy group, and
   n stands for 0 or 1, and
   b. hollow microspheres, made of a copolymer obtained by polymerizing methacrylonitrile and at least one monomer M2, selected from acrylic acid, methacrylic acid, acrylic acid alkyl esters and methacrylic acid alkyl esters, wherein the copolymer comprises maximum 5 wt. % of units incorporated from additional monomers, wherein the copolymer is free of chlorine atoms.

2. The curable composition according to claim 1, wherein the alkoxysilane- and/or acyloxysilane-terminated polymer possesses at least two end groups of the general Formula (I).

3. The curable composition according to claim 1, wherein X stands for a $C_1$-$C_8$ alkyl group and Y and Z each stand for a $C_1$-$C_8$ alkoxy group or X, Y and Z each stand for a $C_1$-$C_8$ alkoxy group.

4. The curable composition according to claim 1, wherein the $C_1$-$C_8$ alkyl group is a methyl or ethyl group, and in which the $C_1$-$C_8$ alkoxy group is a methoxy or ethoxy group.

5. The curable composition according to claim 1, wherein the backbone of the alkoxysilane- and/or acyloxysilane-terminated polymer is selected from polyurethanes, polyethers, polyesters, polyacrylates, polymethacrylates, polyacrylamides, polymethacrylamides, polyvinyl esters, polyolefines, alkyd resins, phenol resins, vinyl polymers, styrene-butadiene copolymers, as well as copolymers of one or more of the group.

6. The curable composition according to claim 1, wherein the hollow microspheres consist of a copolymer that is obtained by polymerizing methacrylonitrile and at least one monomer M2, selected from acrylic acid, methacrylic acid, acrylic acid alkyl esters and methacrylic acid alkyl esters, wherein the copolymer does not comprise any units incorporated from additional monomers.

7. The curable composition according to claim 6, wherein the hollow microspheres consist of a methacrylonitrile-methyl methacrylate copolymer.

8. The curable composition according to claim 1, comprising the hollow microspheres in an amount of 0.01 to 5 wt. %, based on the total weight of the curable composition.

9. The curable composition according to claim 1, comprising no hollow microspheres of vinylidene chloride-containing polymers.

10. The curable composition according to claim 1, comprising chlorine free filler.

11. The curable composition according to claim 1, further comprising a plasticizer.

12. The curable composition according to claim 1, wherein it is free of tin.

13. The curable composition according to claim 1, comprising
    100 parts by weight of the alkoxysilane- and/or acyloxysilane-terminated polymer,
    0.5-10 parts by weight of adhesion promoter,
    5-150 parts by weight of plasticizer,
    0.01-1 part by weight of catalyst,
    5-125 parts by weight of filler,
    0.1-10 parts by weight of drying agent, as well as optionally
    0-10 parts by weight of other additives, such as pigments, stabilizers, UV-absorbers, anti-aging agents, antioxidants, rheological aids, diluents or reactive diluents and/or solvents, as well as fungicides and flame retardants,
    wherein the filler comprises the hollow microspheres.

14. A process for manufacturing a curable composition according to claim 1, comprising mixing together at least:

a) an alkoxysilane- and/or acyloxysilane-terminated polymer containing at least one end group of the general Formula (I)

-$A_n$-R—SiXYZ (I), in which
  A stands for a divalent binding group,
  R stands for a divalent $C_1$-$C_{12}$ hydrocarbon group that optionally contains a heteroatom,
  X, Y, Z each independently of one another stand for a $C_1$-$C_8$ alkyl, $C_1$-$C_8$ alkoxy or $C_1$-$C_8$ acyloxy group, wherein at least one of the groups X, Y, Z is a $C_1$-$C_8$ alkoxy or $C_1$-$C_8$ acyloxy group,
  n stands for 0 or 1, and
b) hollow microspheres, made of a copolymer that is obtainable by polymerizing methacrylonitrile and at least one monomer M2, selected from acrylic acid, methacrylic acid, acrylic acid alkyl esters and methacrylic acid alkyl esters, wherein the copolymer comprises maximum 5 wt. % of units incorporated from additional monomers, and is free of chlorine-containing units, as well as optionally adhesion promoters, catalysts, drying agents, plasticizers, additional fillers, and/or additional additives.

15. An adhesive for bonding plastics, metals, glass, ceramics, wood, wood materials, paper, paper materials, rubber and textiles or a for sealant for buildings or parts thereof comprising the curable composition according to claim 1.

16. The curable composition according to claim 1, further comprising a plasticizer selected from a fatty acid ester, a dicarboxylic acid ester, an ester of a fatty acid carrying OH-groups or of an epoxidized fatty acid, a fat, an ester of glycolic acid, an ester of phthalic acid, an ester of benzoic acid, an ester of phosphoric acid, an ester of sulfonic acid, an ester of trimellitic acid, an epoxidized plasticizer, a polyether plasticizer, a polystyrene, a hydrocarbon plasticizer and a chlorinated paraffin, as well as mixtures of two or more thereof.

17. The curable composition according to claim 1 wherein divalent binding group A is urethane.

18. The curable composition according to claim 1 wherein R is selected from methylene, ethylene or propylene.

* * * * *